(12) United States Patent
Faust et al.

(10) Patent No.: US 11,452,253 B2
(45) Date of Patent: Sep. 27, 2022

(54) REARWARD FACING MULTI-PURPOSE CAMERA WITH WINDROW WIDTH INDICATIONS

(71) Applicant: DEERE & COMPANY, Moline, IL (US)

(72) Inventors: Jeremy J. Faust, Ottumwa, IA (US); Mitchell R. Usasz, Ottumwa, IA (US); Eric M. Thies, Ottumwa, IA (US); Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 690 days.

(21) Appl. No.: 16/539,049

(22) Filed: Aug. 13, 2019

(65) Prior Publication Data

US 2021/0045283 A1  Feb. 18, 2021

(51) Int. Cl.
*A01B 79/00* (2006.01)
*A01D 41/127* (2006.01)
*A01D 57/28* (2006.01)
*A01D 89/00* (2006.01)
*H04N 5/232* (2006.01)

(52) U.S. Cl.
CPC .......... *A01B 79/005* (2013.01); *A01D 41/127* (2013.01); *A01D 57/28* (2013.01); *A01D 89/006* (2013.01); *H04N 5/23238* (2013.01)

(58) Field of Classification Search
CPC .. A01B 79/005; A01B 69/001; A01D 41/127; A01D 57/28; A01D 89/006; A01D 34/667; H04N 5/23238
See application file for complete search history.

(56) References Cited

U.S. PATENT DOCUMENTS

| | | | |
|---|---|---|---|
| 2011/0191001 A1* | 8/2011 | Viaud | A01F 15/106 702/182 |
| 2012/0262568 A1 | 10/2012 | Ruthenberg | |
| 2015/0089912 A1 | 4/2015 | Patton et al. | |
| 2018/0271015 A1* | 9/2018 | Redden | G06N 3/006 |
| 2019/0166760 A1* | 6/2019 | Palla | H04L 67/00 |
| 2019/0212902 A1 | 7/2019 | Allgaier et al. | |

FOREIGN PATENT DOCUMENTS

| | | |
|---|---|---|
| EP | 3400780 A1 | 11/2018 |
| WO | WO2018206678 A1 | 11/2018 |

OTHER PUBLICATIONS

European Search Report issued in counterpart application No. 20189159.5 dated Jan. 12, 2021 (06 pages).

* cited by examiner

*Primary Examiner* — Richard M Camby

(57) ABSTRACT

A crop windrow monitoring system includes an image sensor positioned to include a field of view facing a rearward direction of a power unit, and a visual monitor operable to display an image. A computing device is operable to determine an intended direction of movement of the power unit. The image is displayed on the visual monitor in a first mode having a first magnification when the intended direction of movement includes the rearward direction. The image is displayed on the visual monitor in a second mode having a second magnification and overlaid with indicia indicating a width of the windrow when the intended direction of movement includes the forward direction. The second magnification may be larger than the first magnification.

20 Claims, 3 Drawing Sheets

REARWARD FACING MULTI-PURPOSE CAMERA WITH WINDROW WIDTH INDICATIONS

TECHNICAL FIELD

The disclosure generally relates to a crop windrow monitoring system.

BACKGROUND

Agricultural implements for mowing crops, such as but not limited to mower-conditioners or self-propelled windrowers, may include a windrow forming unit that is configured for forming cut crop material into a windrow. The implement moves in a forward direction, with the windrow formed rearward of the implement. An operator may monitor the shape and/or size of the windrow and may adjust one or more forming elements to change the shape and/or size of the windrow as desired. However, the windrow is formed rearward of the operator, i.e., in direction opposite the direction of travel of the implement when cutting crop material and forming the crop material into the windrow, thereby making it difficult for the operator to view the recently formed windrow while operating the implement.

SUMMARY

A crop windrow monitoring system is provided. The crop windrow monitoring system includes a power unit that is controllable for movement between a forward direction and a rearward direction. A windrow forming unit is coupled to the power unit. The windrow forming unit is operable to form crop material into a windrow. An image sensor is positioned to include a field of view facing the rearward direction. The field of view includes the windrow. The image sensor is operable to capture an image of the windrow. A visual monitor is operable to display the image. A computing device is disposed in communication with the image sensor and the visual monitor. The computing device includes a processor and a memory having an image display algorithm saved thereon. The processor is operable to execute the image display algorithm to determine an intended direction of movement of the power unit. The intended direction of movement includes one of the forward direction or the rearward direction. The image is displayed on the visual monitor in a first mode having a first magnification when the intended direction of movement includes the rearward direction. The image is displayed on the visual monitor in a second mode having a second magnification when the intended direction of movement includes the forward direction. The first magnification is different than the second magnification.

In one aspect of the disclosure, the second magnification is greater than the first magnification. As such, when the power unit is moving in the forward direction, the image is displayed at a greater magnification to better see the windrow, than when the power unit is moving in the rearward direction, i.e., in reverse. The first magnification used to display the image when the power unit is moving in the rearward direction is smaller than the second magnification so that the operator may better see the surrounding area to maneuver the power unit.

In one aspect of the disclosure, the power unit includes a prime mover and a transmission drivingly coupled to the prime mover. The transmission is controllable between a forward drive state for movement in the forward direction, and a rearward drive state for movement in the rearward direction. The processor is operable to execute the image display algorithm to determine the intended direction of movement by determining a current operating state of the transmission. The current operating state of the transmission includes the one of the forward drive state and the rearward drive state that the transmission is currently disposed in.

In one aspect of the disclosure, the windrow forming unit includes at least one forming element moveable between at least a first position and a second position. The forming element is moved to control a dimension of the windrow. The forming element may include, but is not limited to, a forming shield, a swath flap, impeller hood, and/or a conditioner roll gap spacing. The operator may control the position of the forming element based on the image displayed on the visual monitor.

In one aspect of the disclosure, the processor is operable to execute the image display algorithm to display indicia on the visual monitor when the image is displayed in the second mode. The processor may not display the indicia when the image is displayed in the second mode. The indicia are overlaid onto the image displayed on the visual monitor. In one embodiment, the indicia are correlated to an actual width of the windrow. The indicia may include, but are not limited to, linear segments extending parallel to the windrow and arranged to delimit a distance perpendicular to the windrow, e.g., a width of the windrow. The linear segments are spaced from each other on the visual monitor a scaled separation distance to represent a defined distance in the image. As such, the scaled separation distance is scaled on the visual monitor to correspond to an actual distance or width perpendicular to the windrow. The scaled separation distance is dependent upon and related to the first magnification. As such, the scaled separation distance changes in accordance with a change in the first magnification.

The processor may be operable to execute the image display algorithm to receive an input defining the second magnification, such that the second magnification is a user selected magnification. The scaled separation distance may then be defined to correspond to the user selected second magnification, such that the scaled separation distance accurately reflects the defined distance in the image and is correlated to the actual distance that the defined distance represents in the image relative to the windrow.

Accordingly, the operator may view the windrow as it is formed in the visual monitor. The image of the windrow displayed on the visual monitor is magnified to provide a better view of the windrow. The indicia may be displayed on the visual monitor, overlaid onto the image. The indicia are scaled based on the level of magnification to correlate to an actual size of the windrow, thereby providing a visual indicator of the width of the windrow. Based on the width of the windrow, the operator may control the forming element of the windrow forming unit to adjust the shape of the windrow. When the operator moves the power unit in reverse, the image from the rearward facing image sensor is displayed at a lower magnification and without the indicia, so that the operator may have a larger field of view of maneuvering the power unit in the rearward direction.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Referring to the Figures, wherein like numerals indicate like parts throughout the several views, a windrower is generally shown at 20. The windrower 20 includes a crop windrow monitoring system 22. While the example embodiment of the crop windrow monitoring system 22 is shown incorporated into the windrower 20 shown in FIG. 1, it should be appreciated that the crop windrow monitoring system 22 may be incorporated into other vehicles and/or combination of vehicles. For example, the crop windrow monitoring system 22 may be incorporated into a conventional agricultural tractor independently or in combination with a drawn mower or mower-conditioner implement. As such, the teachings of this disclosure are not limited to the example embodiment of the windrower 20 shown in FIGS. 1 and 2.

Figure 1:
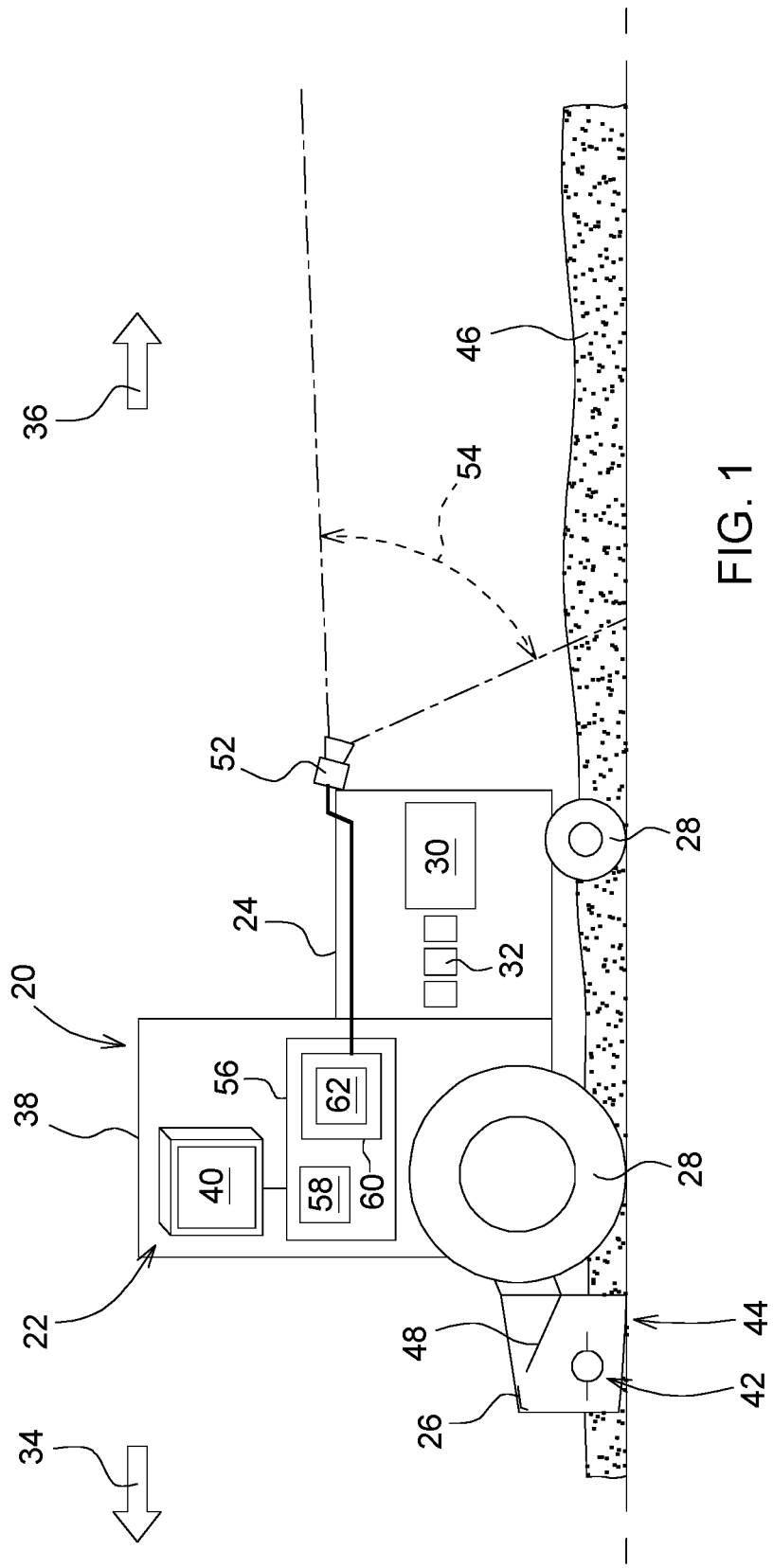
FIG. 1 is a schematic side view of a windrower.
Figure 2:
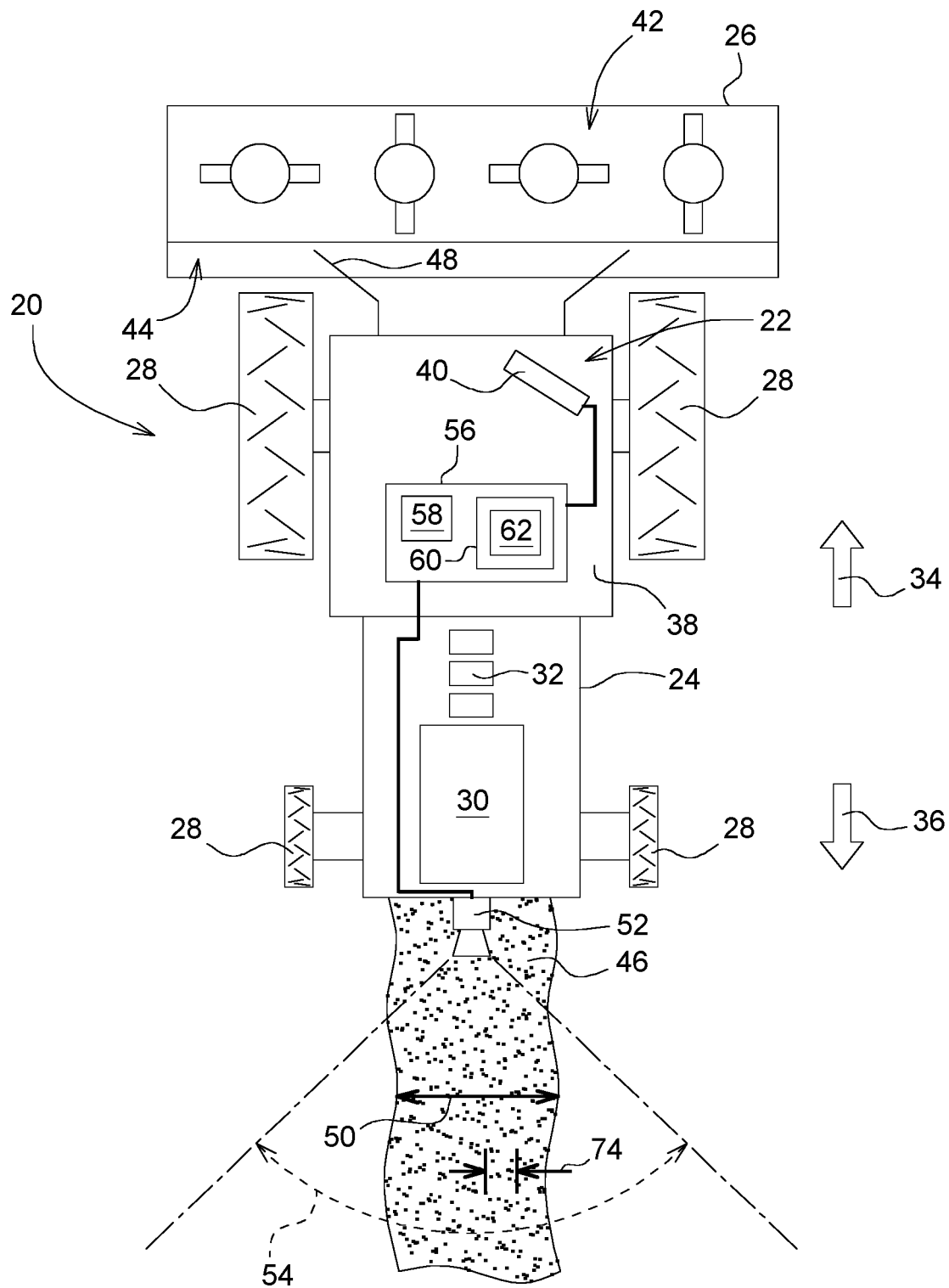
FIG. 2 is a schematic top view of the windrower.

Referring to FIGS. 1 and 2, the windrower 20 includes a power unit 24 and a head unit 26. The power unit 24 includes a frame supporting multiple ground engaging elements 28, e.g., wheels. The power unit 24 includes a prime mover 30 and a transmission 32 attached to and supported by the frame. The prime mover 30 may include a device or system capable of generating torque for propelling the power unit 24, as well as powering the head unit 26. The prime mover 30 may include, but is not limited to, an internal combustion engine and/or an electric motor. The specific details and operation of the prime mover 30 are not pertinent to the teachings of this disclosure, are well known in the art, and are therefore not described in detail herein.

The transmission 32 is drivingly coupled to the prime mover 30. As such, the transmission 32 receives torque from the prime mover 30 and converts and/or transfers the torque to other components of the power unit 24 for propelling the power unit 24. The transmission 32 is controllable for movement between a forward direction 34 and a rearward direction 36. As used herein, the term "forward direction" includes a direction of travel of the power unit 24 along a longitudinal axis of the power unit 24 when cutting crop material, i.e., moving forward from a front of the power unit 24. The term "rearward direction" includes a direction of travel of the power unit 24 along the longitudinal axis of the power unit 24 that is opposite the forward direction 34, i.e., moving backward from a rear of the power unit 24.

The transmission 32 may include, but is not limited to, a mechanical and/or hydraulic transmission 32 such as included in conventional agricultural tractors, or a hydraulic drive system including one or more pumps and hydraulic motors such as often included in the windrower 20 of the example shown in FIGS. 1 and 2. The transmission 32 is controllable between a forward drive state for movement in the forward direction 34, and a rearward drive state for movement in the rearward direction 36. The transmission 32 may include any device capable of receiving torque from the prime mover 30 and transferring and/or converting the torque to other components for propelling the power unit 24 in the forward direction 34 and the rearward direction 36. The specific type, configuration, and operation of the transmission 32 is not pertinent to the teachings of the disclosure, are well known to those skilled in the art, and are therefore not described in detail herein.

The power unit 24 may further include a cab 38 mounted on the frame. The cab 38 may include components for controlling the operation of the power unit 24 and the head unit 26. For example, the cab 38 may include control inputs for controlling the operation of the prime mover 30, e.g., an ignition switch, a throttle, etc., as well as control inputs for controlling the operation of the transmission 32, e.g., between the forward drive state and the rearward drive state. The cab 38 further includes a visual monitor 40, described in greater detail below. The cab 38 may include other components not pertinent to the teachings of this disclosure, which are not described herein.

The example embodiment of the windrower 20 shown in FIG. 1 includes the head unit 26. However, it should be appreciated that other embodiments of the teachings of this disclosure may describe the features of the head unit 26 as part of other implements, such as but not limited to a mower or a mower-conditioner. Accordingly, the teachings of the disclosure should not be limited to the head unit 26 of the windrower 20 shown in the example of FIG. 1. The head unit 26 includes a cutting system 42 and a windrow forming unit 44 coupled to the power unit 24. The cutting system 42 is operable to cut crop. The specific type, configuration, and operation of the cutting system 42 are not pertinent to the teachings of this disclosure, are known to those skilled in the art, and are therefore not described in detail herein.

The windrow forming unit 44 is operable to receive the crop from the cutting system 42, and form crop material into a windrow 46. The windrow forming unit 44 includes at least one forming element 48 moveable between at least a first position and a second position to control a dimension of the windrow 46, e.g., a width 50 of the windrow 46. The forming element 48 may include, but is not limited to, a forming shield, a hood, a swath plate, a swath board, conditioner rolls, or some other device that affects the shape and/or dimensions of the windrow 46. The particular manner in which the forming element 48 operates, and how the forming element 48 shapes the windrow 46 are not pertinent to the teachings of this disclosure, are dependent upon the specific configuration and/or type of forming device, are known to those skilled in the art, and are therefore not described in detail herein.

The crop windrow monitoring system 22 further includes an image sensor 52. The image sensor 52 is positioned to include a field of view 54 (shown in FIG. 2) facing the rearward direction 36 of the power unit 24. The field of view 54 is positioned to include at least a portion of the windrow 46 immediately rearward of the windrow forming unit 44. The image sensor 52 may be mounted on the power unit 24, such as the example embodiment of the windrower 20 shown in FIG. 1. However, in other embodiments, the image sensor 52 may be mounted on some other implement, such as a traditional agricultural tractor, or a mower or mower-conditioner that is drawn behind a tractor. The image sensor 52 is operable to capture an image of the windrow 46. The image may include a still image, or a video image. The image sensor 52 may include any device capable of sensing an image. For example, the image sensor 52 may include, but is not limited to, a digital camera, LIDAR, thermal imagining devices, radar, sonar, or other similar image sensing device.

As noted above, the cab 38 may include the visual monitor 40. The visual monitor 40 is part of the crop windrow monitoring system 22. The visual monitor 40 is an output device that is operable to present a visual image, e.g., the image captured by the image sensor 52. For example, the visual monitor 40 may include, but is not limited to, a cathode ray tube display, a light emitting diode display, an electroluminescent display, a plasma display, a liquid crystal display, a thin film transistor display, a organic light emitting diode display, a digital light processing display, or some other similar device.

The crop windrow monitoring system 22 further includes a computing device 56 that is disposed in communication with the image sensor 52 and the visual monitor 40. The computing device 56 may alternatively be referred to as a controller, a control device, a control unit, a control module, a computer, etc. The computing device 56 is operable to receive data from the image sensor 52 and control the operation of the visual monitor 40. The computing device 56 may include a processor 58, a memory 60, and all software, hardware, algorithms, connections, sensors, etc., necessary to manage and control the operation of the visual monitor 40 in accordance with the teachings of this disclosure. As such, a method may be embodied as a program or algorithm operable on the computing device 56. It should be appreciated that the computing device 56 may include any device capable of analyzing data from various sensors, comparing data, and making the necessary decisions required to control the operation of the visual monitor 40.

The computing device 56 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 60 may include any non-transitory/tangible medium which participates in providing data or computer-readable instructions. Memory 60 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

As noted above, the computing device 56 includes the tangible, non-transitory memory 60 on which are recorded computer-executable instructions, including an image display algorithm 62. The processor 58 of the computing device 56 is configured for executing the image display algorithm 62. The image display algorithm 62 implements a method of presenting a rearward facing image on the visual monitor 40.

The image display algorithm 62 determines a current status of a defined system operating condition. The defined system operating condition may include any operating condition of the power unit 24 and/or the windrow forming unit 44. In the example embodiment described herein, the defined system operating condition includes the intended direction of movement of the power unit 24 and the windrow forming unit 44. The intended direction of movement includes one of the forward direction 34 or the rearward direction 36. In other words, in the example embodiment described herein, the image display algorithm 62 determines, based on equipment configurations, settings, or sensor data, what the intended direction of movement or travel of the power unit 24 is, i.e., actual or intended movement in the forward direction 34, or actual or intended movement in the rearward direction 36. The image display algorithm 62 may determine the intended direction of movement in any manner. For example, the image display algorithm 62 may determine the intended direction of movement based on the current actual movement of the power unit 24, a current configuration or operating state of the transmission 32, or by some other process not described herein.

For example, the image display algorithm 62 may determine the intended direction of movement by determining a current operating state of the transmission 32. The current operating state of the transmission 32 includes the one of the forward drive state and the rearward drive state that the transmission 32 is currently disposed in. Accordingly, by sensing the current operating state of the transmission 32, i.e., the forward drive state or the rearward drive state, the image display algorithm 62 may determine the intended direction of movement of the power unit 24.

As noted above, the image sensor 52 senses an image rearward of the power unit 24. The image may include a single still image, or multiple images forming a video image. The image includes the windrow 46 positioned rearward of the windrow forming unit 44. The image display algorithm 62 displays the image on the visual monitor 40 in a first mode or a second mode based on the defined system operating condition of the power unit 24 and/or the windrow forming unit 44.

Figure 3:
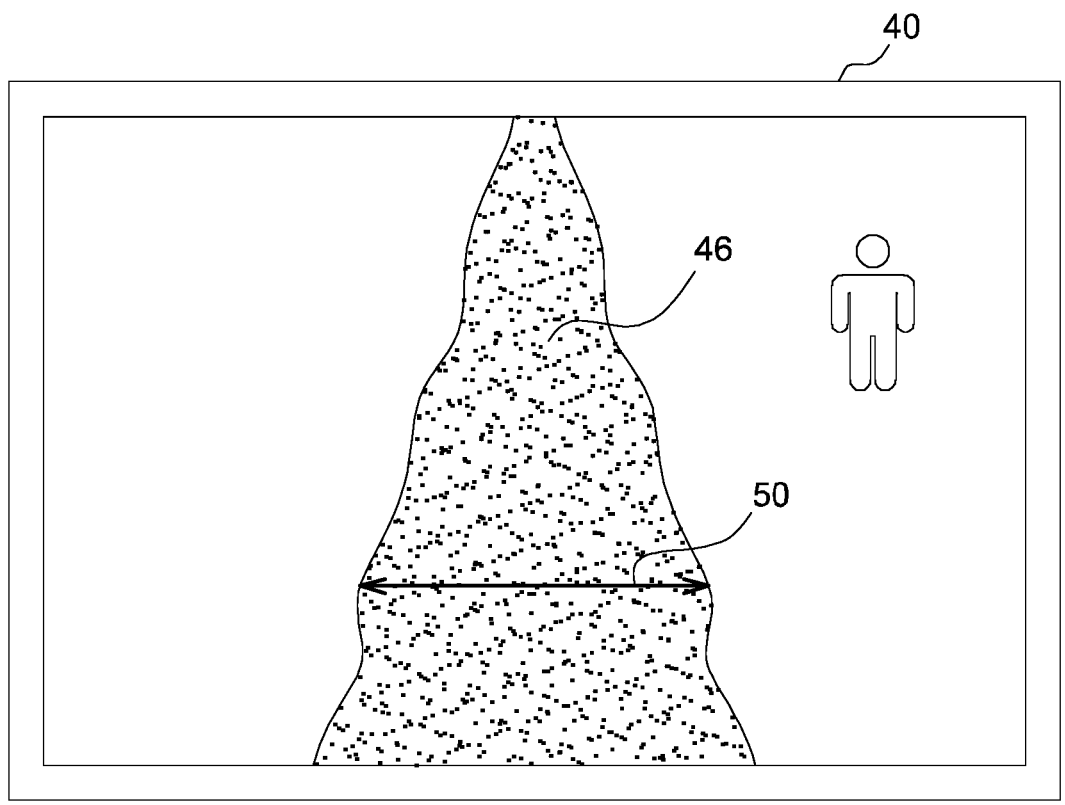
FIG. 3 is a schematic plan view of a visual monitor displaying an image in a first mode.
Figure 4:
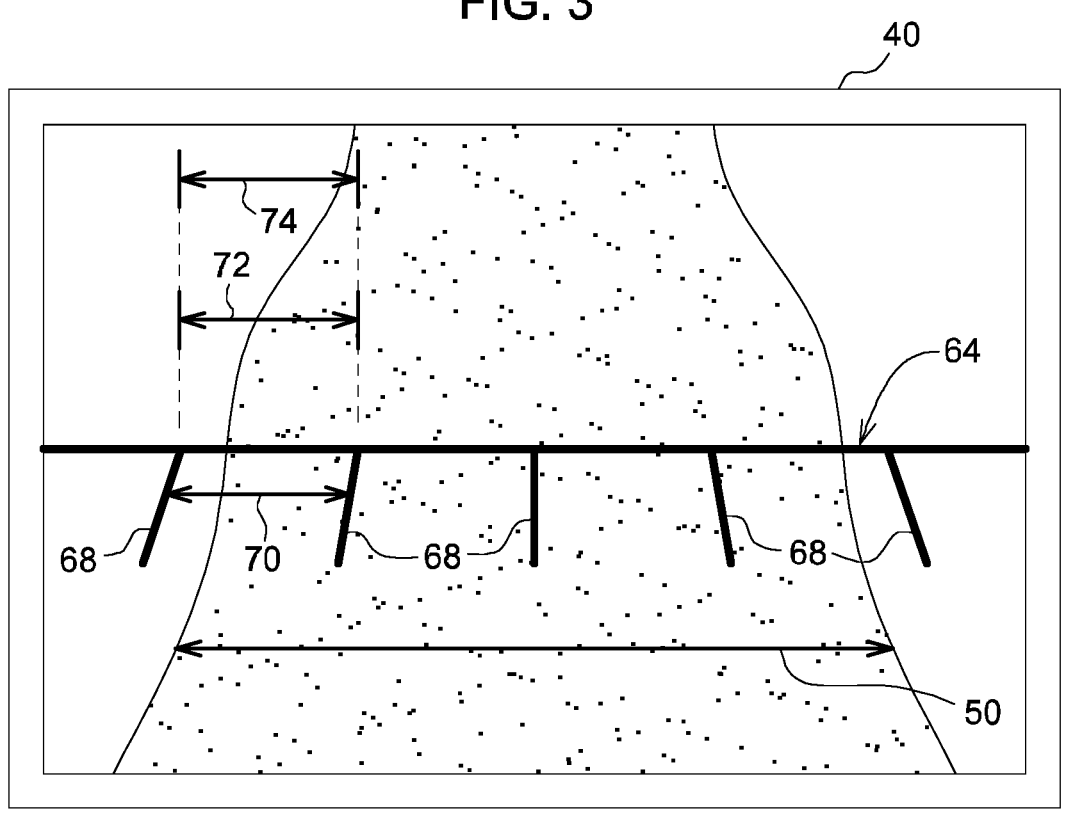
FIG. 4 is a schematic plan view of the visual monitor displaying the image in a second mode.

Referring to FIG. 3, the image display algorithm 62 displays the image on the visual monitor 40 in the first mode when the defined system operating condition is a first operating condition. Referring to FIG. 4, the image display algorithm 62 displays the image on the visual monitor 40 in the second mode when the defined system operating condition is a second operating condition. As noted above, the example embodiment described herein defines the defined system operating condition as the intended direction of movement of the power unit 24 and the windrow forming unit 44, the first operating condition may be defined as intended movement in the rearward direction 36, and the second operating condition may be defined as intended movement in the forward direction 34.

When the image is displayed in the first mode, such as shown in FIG. 3, the image is displayed on the visual monitor 40 at a first magnification. When the image is displayed in the second mode, such as shown in FIG. 4, the image is displayed on the visual monitor 40 at a second magnification. The first magnification is different than the second magnification. More particularly, in the example embodiment described herein, the second magnification is greater than the first magnification. The magnification may be achieved by, but is not limited to, a digital zoom or a focal plane zoom of the image sensor 52.

In the example embodiment described herein, the image display algorithm 62 displays the image in the first mode at the first magnification (lower magnification) when the intended direction of movement is in the rearward direction 36. In contrast, the image display algorithm 62 displays the image in the second mode at the second magnification (higher magnification) when the intended direction of movement is in the forward direction 34. Accordingly, referring to FIG. 4, when the intended direction of movement is in the forward direction 34, such as when cutting crop material, the image is displayed on the visual monitor 40 at the higher second magnification so that the operator can better see the details of the windrow 46, whereas, referring to FIG. 3, when the intended direction of movement is in the rearward direction 36, such as when the operator intends to back-up the power unit 24, the image is displayed on the visual monitor 40 at the lower first magnification so that the operator may get a wider view rearward of the power unit 24.

Referring to FIG. 4, when the image is displayed in the second mode, e.g., when the intended direction of movement includes the forward direction 34, the image display algorithm 62 may display indicia 64 on the visual monitor 40. The indicia 64 are overlaid onto the image displayed on the visual monitor 40. The indicia 64 may be correlated and/or scaled relative to the second magnification of the image on the visual display to represent an actual dimension of the windrow 46, e.g., the width 50 or a portion of the width 50 of the windrow 46.

The indicia 64 may include, but are not limited to, linear segments 68 or tick marks that extend parallel to the windrow 46. The linear segments 68 are arranged to delimit a distance perpendicular to the windrow 46. As such, the linear segments 68 are generally parallel with each other, and parallel with the windrow 46. The linear segments 68 are spaced from each other on the visual monitor 40 a scaled separation distance 70 to represent a defined distance 72 in the image. The scaled separation distance 70 is the distance on the visual monitor 40 between adjacent pairs of linear segments 68. The defined distance 72 in the image represents an actual distance 74 (shown in FIG. 2) perpendicular to the windrow 46. As such, the scaled separation distance 70 between adjacent pairs of the linear segments 68 is correlated to the actual distance 74 perpendicular to the windrow 46. For example, the scaled separation distance 70 may be equal to one inch on the visual monitor 40. The one inch scaled separation distance 70 between adjacent linear segments 68 on the visual monitor 40 may be sized to represent a defined distance 72 in the image that represents one foot. The defined distance 72 in the image that represents one foot corresponds to an actual distance 74 perpendicular to the windrow 46 that is also equal to one foot. As such, the linear segments 68 may be spaced from each other on the visual monitor 40 the scaled separation distance 70, such that the distance between each pair of adjacent linear segments 68 represents a distance of one foot perpendicular to the windrow 46.

The scaled separation distance 70 is dependent upon the second magnification. As such, as the second magnification changes, the scaled separation distance 70 must also change so that the actual distance 74 perpendicular to the windrow 46 represented by adjacent pairs of the linear segments 68 remains accurate. For example, if the scaled separation distance 70 of the linear segments 68 is configured to represent an actual one foot distance perpendicular to the windrow 46, when the second magnification is increased, the scaled separation distance 70 between adjacent pairs of linear segments 68 must also increase a corresponding amount so that the scaled separation distance 70 between adjacent pairs of the linear segments 68 maintains is one foot representation of the actual distance 74 perpendicular to the windrow 46.

In one embodiment, the image display algorithm 62 may be configured to receive an input defining and/or adjusting the second magnification, such that the second magnification is a user selected second magnification. As such, the user may increase or decrease the second magnification, and the image display algorithm 62 automatically adjusts the scaled separation distance 70 between the indicia 64 so that the indicia 64 maintain the representation of the defined distance 72.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A crop windrow monitoring system comprising:
    a power unit controllable for movement between a forward direction and a rearward direction;
    a windrow forming unit coupled to the power unit and operable to form crop material into a windrow;
    an image sensor positioned to include a field of view facing the rearward direction and including the windrow, wherein the image sensor is operable to capture an image of the windrow;
    a visual monitor operable to display the image;
    a computing device in communication with the image sensor and the visual monitor, wherein the computing device includes a processor and a memory having an image display algorithm saved thereon, and wherein the processor is operable to execute the image display algorithm to:
        determine an intended direction of movement of the power unit, wherein the intended direction of movement includes one of the forward direction or the rearward direction; and
        display the image on the visual monitor in a first mode having a first magnification when the intended direction of movement includes the rearward direction, or a second mode having a second magnification when the intended direction of movement includes the forward direction, wherein the first magnification is different than the second magnification.

2. The crop windrow monitoring system set forth in claim 1, wherein the second magnification is greater than the first magnification.

3. The crop windrow monitoring system set forth in claim 1, wherein the power unit includes a prime mover and a transmission drivingly coupled to the prime mover, wherein the transmission is controllable between a forward drive state for movement in the forward direction and a rearward drive state for movement in the rearward direction, and wherein the processor is operable to execute the image display algorithm to determine the intended direction of movement by determining a current operating state of the transmission, wherein the current operating state of the transmission includes the one of the forward drive state and the rearward drive state that the transmission is currently disposed in.

4. The crop windrow monitoring system set forth in claim 1, wherein the windrow forming unit includes at least one forming element moveable between at least a first position and a second position to control a dimension of the windrow.

5. The crop windrow monitoring system set forth in claim 1, wherein the processor is operable to execute the image display algorithm to display indicia on the visual monitor when the image is displayed in the second mode, wherein the indicia is overlaid onto the image.

6. The crop windrow monitoring system set forth in claim 5, wherein the indicia includes linear segments extending parallel to the windrow and arranged to delimit a distance perpendicular to the windrow.

7. The crop windrow monitoring system set forth in claim 6, wherein the linear segments are spaced from each other on the visual monitor a scaled separation distance to represent a defined distance in the image.

8. The crop windrow monitoring system set forth in claim 7, wherein the scaled separation distance is dependent upon the second magnification.

9. The crop windrow monitoring system set forth in claim 8, wherein the processor is operable to execute the image display algorithm to receive an input defining the first magnification, such that the second magnification is a user selected second magnification.

10. The crop windrow monitoring system set forth in claim 7, wherein the defined distance in the image represents an actual distance relative to the windrow.

11. The crop windrow monitoring system set forth in claim 5, wherein the indicia is correlated to an actual width of the windrow.

12. A crop windrow monitoring system comprising:
a windrow forming unit operable to form crop material into a windrow;
an image sensor positioned to include a field of view facing a rearward direction of the windrow forming unit and including the windrow, wherein the image sensor is operable to capture an image of the windrow;
a visual monitor operable to display the image;
a computing device in communication with the image sensor and the visual monitor, wherein the computing device includes a processor and a memory having an image display algorithm saved therein, and wherein the processor is operable to execute the image display algorithm to:
display the image on the visual monitor in a first mode having a first magnification when a defined system operating condition is a first operating condition, or a second mode having a second magnification when the defined system condition is a second operating condition, wherein the first magnification is different than the second magnification.

13. The crop windrow monitoring system set forth in claim 12, wherein the defined system operating condition includes an intended direction of movement of the windrow forming unit.

14. The crop windrow monitoring system set forth in claim 13, wherein the first operating condition includes an intended rearward direction, and the second operating condition includes an intended forward direction.

15. The crop windrow monitoring system set forth in claim 14, wherein the second magnification is greater than the first magnification.

16. The crop windrow monitoring system set forth in claim 12, wherein the processor is operable to execute the image display algorithm to display indicia on the visual monitor when the image is displayed in the second mode, wherein the indicia is overlaid onto the image.

17. The crop windrow monitoring system set forth in claim 16, wherein the indicia includes linear segments extending parallel to the windrow and arranged to delimit a distance perpendicular to the windrow.

18. The crop windrow monitoring system set forth in claim 17, wherein the linear segments are spaced from each other on the visual monitor a scaled separation distance to represent a defined distance in the image.

19. The crop windrow monitoring system set forth in claim 18, wherein the scaled separation distance is dependent upon the second magnification.

20. A crop windrow monitoring system comprising:
a power unit controllable for movement between a forward direction and a rearward direction;
a windrow forming unit coupled to the power unit and operable to form crop material into a windrow;
an image sensor positioned to include a field of view facing the rearward direction and including the windrow, wherein the image sensor is operable to capture an image of the windrow;
a visual monitor operable to display the image;
a computing device in communication with the image sensor and the visual monitor, wherein the computing device includes a processor and a memory having an image display algorithm saved thereon, and wherein the processor is operable to execute the image display algorithm to:
determine an intended direction of movement of the power unit, wherein the intended direction of movement includes one of the forward direction or the rearward direction;
display the image on the visual monitor in a first mode having a first magnification when the intended direction of movement includes the rearward direction, or a second mode having a second magnification when the intended direction of movement includes the forward direction, wherein the second magnification is greater than the first magnification;
display indicia on the visual monitor when the image is displayed in the second mode, wherein the indicia is overlaid onto the image and includes linear segments extending parallel to the windrow and arranged to delimit a distance perpendicular to the windrow, and wherein the linear segments are spaced from each other on the visual monitor a scaled separation distance to represent a defined distance in the image.

* * * * *